US012212436B2

(12) United States Patent
 Chauhan

(10) Patent No.: US 12,212,436 B2
(45) Date of Patent: Jan. 28, 2025

(54) DYNAMIC NETWORK ADAPTOR SELECTION IN COMPUTING DEVICES

(71) Applicant: Intel Corporation, Santa Clara, CA (US)

(72) Inventor: Shailendra Singh Chauhan, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 660 days.

(21) Appl. No.: 17/398,423

(22) Filed: Aug. 10, 2021

(65) Prior Publication Data
 US 2022/0417061 A1 Dec. 29, 2022

(30) Foreign Application Priority Data
 Jun. 23, 2021 (IN) .............................. 202141028117

(51) Int. Cl.
 *H04L 25/02* (2006.01)
 *H04L 43/0864* (2022.01)
 *H04L 43/0888* (2022.01)

(52) U.S. Cl.
 CPC ...... *H04L 25/0222* (2013.01); *H04L 43/0864* (2013.01); *H04L 43/0888* (2013.01)

(58) Field of Classification Search
 CPC ............. H04L 25/0222; H04L 43/0864; H04L 43/0888; H04L 12/4013
 USPC ...................................................... 455/426.1
 See application file for complete search history.

(56) References Cited

U.S. PATENT DOCUMENTS

| | | | | |
|---|---|---|---|---|
| 10,524,149 | B2* | 12/2019 | Jung | H04W 24/10 |
| 2007/0049216 | A1* | 3/2007 | Karaoguz | H04B 1/406 |
| | | | | 455/90.3 |
| 2012/0014364 | A1* | 1/2012 | Hansen | H04L 1/0618 |
| | | | | 370/338 |
| 2015/0245372 | A1* | 8/2015 | Desai | H04W 84/12 |
| | | | | 370/338 |
| 2017/0318502 | A1* | 11/2017 | Singh | H04W 36/304 |

* cited by examiner

*Primary Examiner* — Don N Vo
(74) *Attorney, Agent, or Firm* — Schwegman Lundberg & Woessner, P.A.

(57) ABSTRACT

A computing device includes a plurality of baseband processing circuitries. Each baseband processing circuitry of the plurality of baseband processing circuitries is configured to process signals for reception or transmission using a communication standard of a corresponding plurality of communication standards. The computing device further includes an application processor coupled to the plurality of baseband processing circuitries. The application processor is configured to determine a bandwidth of an application executing on the application processor of the computing device, determine a plurality of latencies associated with each baseband processing circuitry of the plurality of baseband processing circuitries, and select a baseband processing circuitry of the plurality of baseband processing circuitries to process transmit or receive data of the application based on the bandwidth and the plurality of latencies.

20 Claims, 7 Drawing Sheets

DYNAMIC NETWORK ADAPTOR SELECTION IN COMPUTING DEVICES

This application claims the benefit of priority to Indian Patent Application No. 202141028117, filed Jun. 23, 2021, which is incorporated herein by reference in its entirety.

TECHNICAL FIELD

Various embodiments generally may relate to the field of network communications and, more specifically, dynamic network adaptor selection in computing devices.

BACKGROUND

With the increased popularity of fifth-generation (5G) communications and subsequent sixth-generation (6G) communications, there is a growing demand for increased flexibility and efficiency in using the communication bandwidth by computing devices.

BRIEF DESCRIPTION OF THE DRAWINGS

In the drawings, like numerals may describe the same or similar components or features in different views. Like numerals having different letter suffixes may represent different instances of similar components. Some embodiments are illustrated by way of example, and not limitation, in the figures of the accompanying drawings in which.

DETAILED DESCRIPTION

Figure 1:
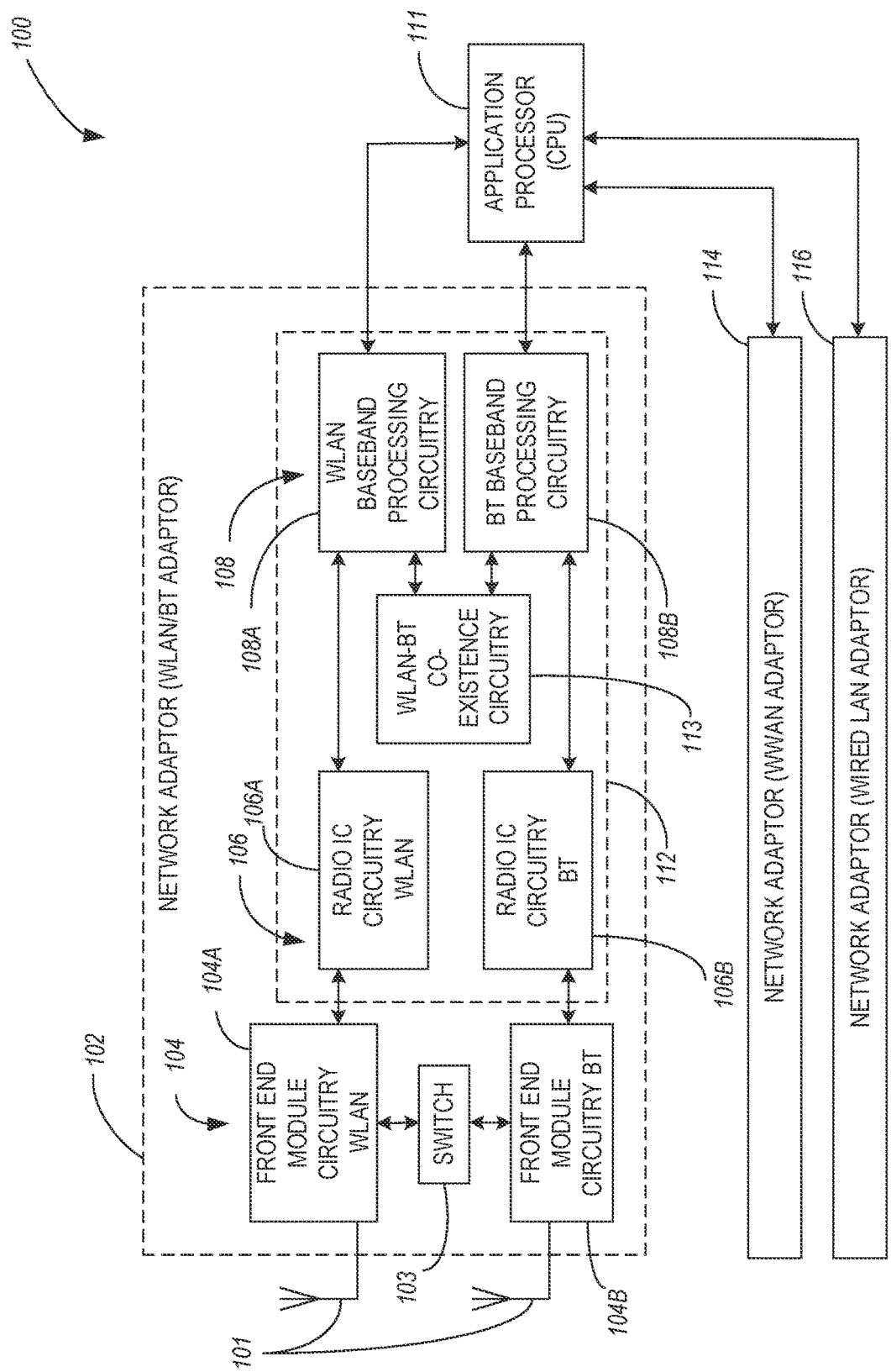
FIG. 1 is a block diagram of a radio architecture with multiple network processing circuitries, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Techniques disclosed herein can be used for dynamic network adaptor selection in computing devices. Computing devices (e.g., wireless devices and other computing devices) can include a plurality of network processing circuitries (e.g., network adaptors) configured to process signals for reception or transmission using a communication standard of a corresponding plurality of communication standards. As used herein, the terms "network processing circuitry", "network circuitry", "network card", "network interface", and "network adaptor" are used interchangeably.

For example, a computing device (such as a personal computer) may include three types of network adaptors—a wired local area network (LAN) adaptor (e.g., an Ethernet adaptor which can be a chip or other type of circuitry within the computer's motherboard), a wireless wide area network (WWAN) adaptor (e.g., a WWAN adaptor included as a WWAN card attached to the computer's motherboard), and a wireless local area network (WLAN) adaptor (e.g., a WLAN adaptor included as a WLAN card attached to the computer's motherboard). Each of the network adaptors may be associated with a different optimization point concerning power and performance. For example, an application may be executing on an application processor of the device, which application needs a sustained bandwidth (BW) greater than a bandwidth threshold (e.g., 1 gigabit-per-second, or 1 Gbps). In this case, the wired LAN adaptor will be an optimal choice due to the increased BW use of the application. Similarly, if the application needs a lower bandwidth (e.g., BW smaller than threshold bandwidth such as 1 Gbps), the WLAN card will be an optimal choice due to reduced power requirements during the idle state as compared to the wired LAN, along with significantly lower power for BW of several megabits-per-second (Mbps). In aspects when the application is latency-critical, the WWAN card (which may be using a 5G network) may be the optimal network adaptor selection. In this regard, the disclosed techniques may be used to evaluate the bandwidth associated with an application executing on the computing device application processor.

The disclosed techniques are also used to determine latencies associated with the plurality of network processing circuitries (or network adaptors) of the computing device and select one of the available network adaptors to process transmit or receive data of the application based on the bandwidth and the determined latencies. The selection of the network adaptor may be performed dynamically (e.g., the bandwidth and the latencies may be evaluated periodically while the application is being executed, and the network adaptor selection is performed each time based on any updates in the bandwidth and the latencies to achieve optimal and efficient data communication). In this way, instead of relying on a static network interface selection, the disclosed techniques may be used for adaptive selection of the network interface.

FIG. 1 is a block diagram of a radio architecture 100 with multiple network processing circuitries in accordance with some embodiments. The radio architecture 100 may be implemented in a computing device (e.g., device 800 in FIG. 8) including user equipment (UE), a base station (e.g., a next generation Node-B (gNB), enhanced Node-B (eNB)), a smartphone, or another type of wired or wireless device using synthesizer circuitry with frequency estimation.

The radio architecture 100 may include a plurality of network processing circuitries, such as network adaptors 102, 114, and 116. Each of the network processing circuitries includes baseband processing circuitry (and other types of processing circuitries) configured to process signals for reception or transmission using a communication standard of a corresponding plurality of communication standards. The first network adaptor 102 is configured to perform network functions associated with WLAN and Bluetooth (BT) communications. In this regard, the first network adaptor 102 is also referred to as WLAN/BT adaptor 102. The second network adaptor 114 is configured to perform network functions associated with WWAN communications. In this regard, the second network adaptor 114 is also referred to as WWAN adaptor 114. The third network adaptor 116 is configured to perform network functions associated with wired LAN (e.g., Ethernet-based) communications. In this regard, the third network adaptor 116 is also referred to as wired LAN adaptor 116.

Even though FIG. 1 illustrates in greater detail only the WLAN/BT adaptor 102, the disclosure is not limited in this regard, and the WWAN adaptor 114 and the wired LAN adaptor 116 may include processing circuitries that are similar to the processing circuitries of the WLAN/BT adaptor illustrated in FIG. 1. For example, the WWAN adaptor 114 and the wired LAN adaptor 116 may each include baseband processing circuitry configured to process signals for reception or transmission using a corresponding communication standard (e.g., a wireless communication standard and an Ethernet-based communication standard).

The radio architecture 100 may include radio front-end module (FEM) circuitry 104, radio IC circuitry 106, and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably. As used herein, the term "WLAN/BT" indicates circuitry which can perform either WLAN or BT functionalities.

FEM circuitry 104 may include a WLAN FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals, and to provide the amplified versions of the received signals to the WLAN radio IC circuitry 106A for further processing. The BT FEM circuitry 104B may include a receive signal path which may include circuitry configured to operate on BT RF signals received from the one or more antennas 101, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by the one or more antennas 101. Besides, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of a FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry (WBPC) 108A. The BT radio IC circuitry 106B may, in turn, include a receive signal path which may include circuitry to down-convert BT RF signals received from the FEM circuitry 104B and provide baseband signals to BT baseband processing circuitry 108B. The WLAN radio IC circuitry 106A may also include a transmit signal path which may include circuitry to up-convert WLAN baseband signals provided by the WBPC 108A and provide WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WBPC 108A and a BT baseband processing circuitry 108B. The WBPC 108A may include a memory, such as, for example, a set of RAM arrays in a Fast Fourier Transform (FFT) or Inverse Fast Fourier Transform (IFFT) block (not shown) of the WBPC 108A. Each of the WBPC 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include a physical layer (PHY) and medium access control layer (MAC) circuitry and may further interface with the application processor 111 for generation and processing of the baseband signals and for controlling operations of the radio IC circuitry 106 or the other processing circuitry of the WLAN/BT adaptor 102.

Referring still to FIG. 1, according to the shown embodiment, WLAN-BT coexistence circuitry 113 may include logic providing an interface between the WBPC 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and the baseband processing circuitry 108 may be provided on a single radio card, such as the WLAN/BT adaptor 102. In some other embodiments, one or more antennas 101, the FEM circuitry 104, and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the WLAN/BT adaptor 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the WLAN/BT adaptor 102 may include a platform controller hub (PCH) system-on-a-chip (SOC) and a central processing unit (CPU)/host SOC.

In some of these multicarrier embodiments, radio architecture 100 may be part of a Wi-Fi communication station (STA) such as a wireless access point (AP), a base station, or a mobile device including a Wi-Fi enabled device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards, including a $3^{rd}$ Generation Partnership Project (3GPP) standard, including a communication standard used in connection with 5G or new radio (NR) communications.

In some embodiments, the radio architecture 100 may be configured for high-efficiency (HE) Wi-Fi communications in accordance with the IEEE 802.11ax standard or another standard associated with wireless communications. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the WLAN/BT adaptor 102, although embodiments are not so limited, and include within their scope discrete WLAN and BT network adaptor (or radio cards). In this regard, a wireless device may include separate network adaptors or wireless radio cards (e.g., with FEM circuitry, radio IC circuitry, and baseband processing circuitry) for each of WWAN, WLAN, and BT communications.

In some embodiments, the radio architecture 100 may include other radio cards, such as a cellular radio card configured for cellular (e.g., 3GPP such as LTE, LTE-Advanced, or 5G communications) (e.g., the WWAN adaptor 114), and radio card for wired LAN (e.g., wired LAN adaptor 116).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 2:
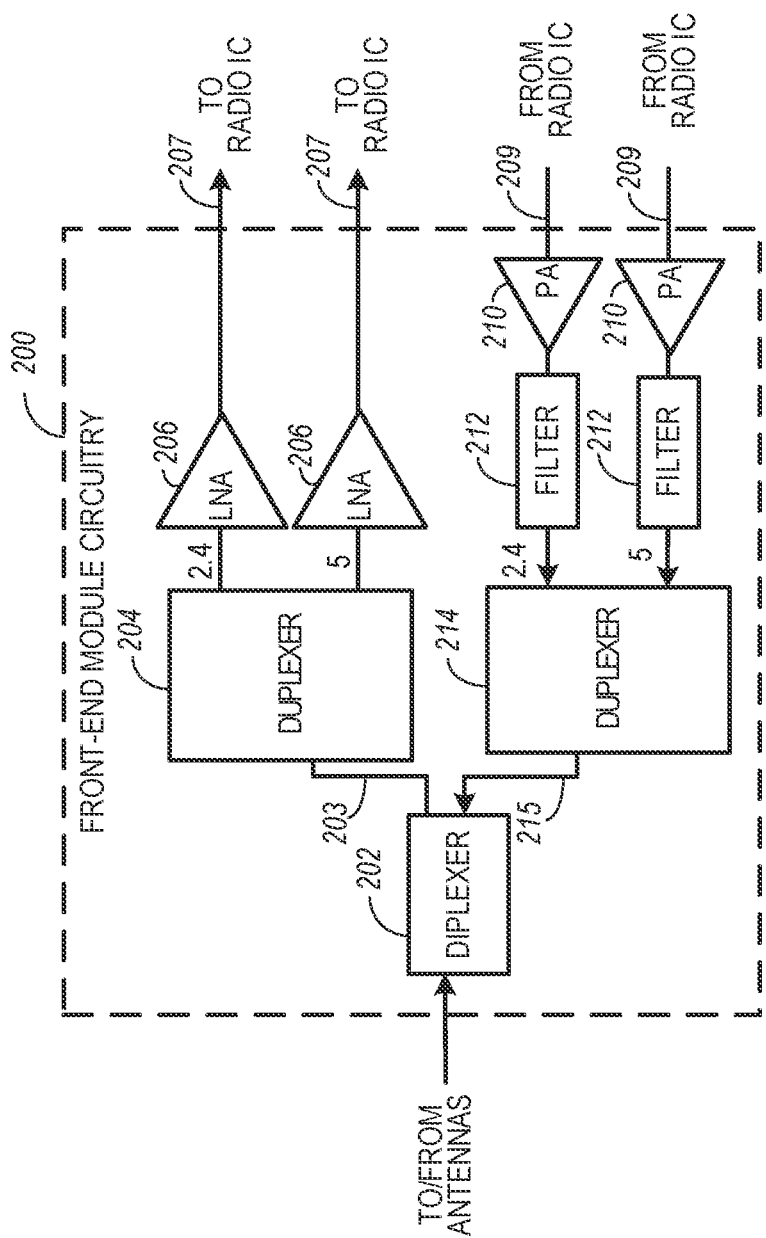
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WWAN/WLAN and/or BT FEM circuitry 104A/104B (FIG. 1), although other circuitry configurations may also be suitable.

In some embodiments, the FEM circuitry 200 may include a diplexer 202 to enable switching between transmit (TX) mode and receive (RX) mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in, e.g., either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and one or more filters 212, such as a BPF, an LPF, or another type of filter for each frequency spectrum, and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal paths and may utilize the same FEM circuitry 200 as the one used for WLAN communications.

Figure 3:
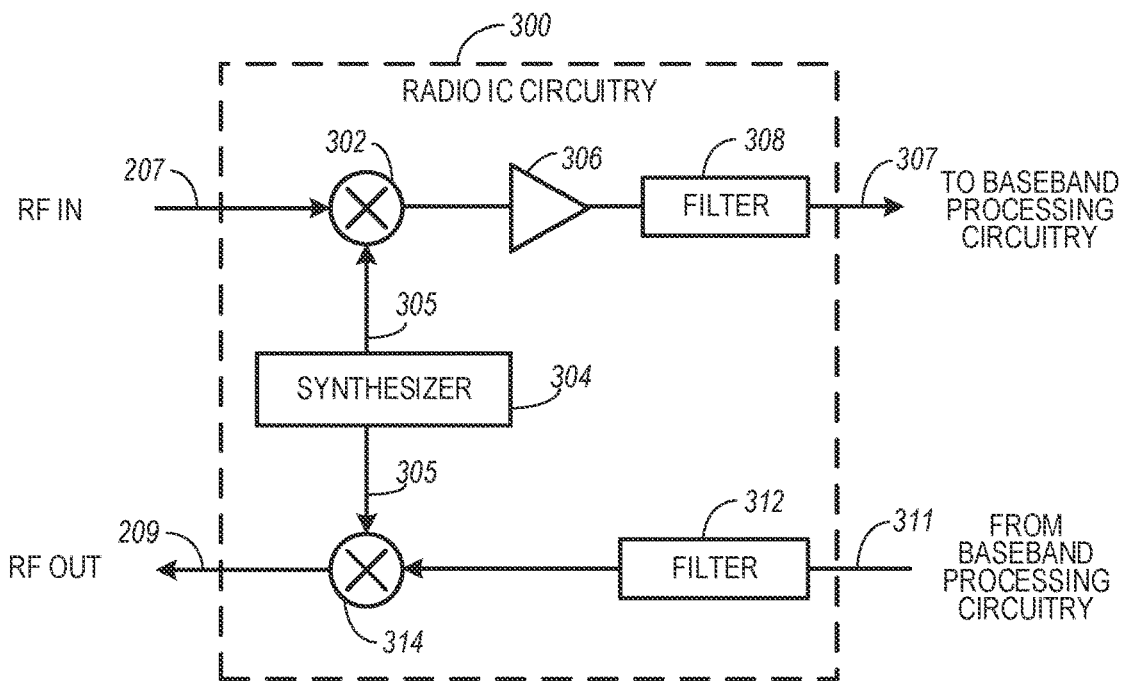
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WWAN/WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include at least filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by the synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of the synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or to filter circuitry 308 (FIG. 3).

In some embodiments, the output baseband signals 307 and the input baseband signals 311 may be analog, although the scope of the embodiments is not limited in this respect. In some alternate embodiments, the output baseband signals 307 and the input baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. In some embodiments, the synthesizer circuitry 304 may be a delta-sigma synthesizer, a frequency multiplier, or a synthesizer comprising a phase-locked loop with a frequency divider. According to some embodiments, the synthesizer circuitry 304 may include a digital frequency synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage-controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
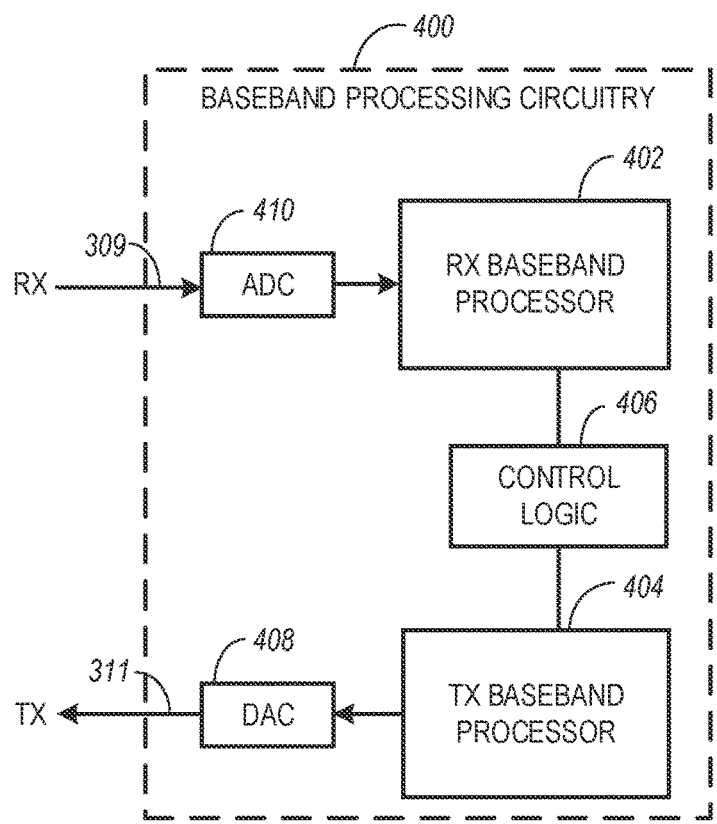
FIG. 4 illustrates a baseband processing circuitry with a modem sub-system processor for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include an analog-to-digital converter (ADC) 410 to convert analog baseband signals 309 received from the radio IC circuitry 106 to digital baseband signals for processing by the RX BBP 402. In these embodiments, the baseband processing circuitry 400 may also include a digital-to-analog converter (DAC) 408 to convert digital baseband signals from the TX BBP 404 to analog baseband signals 311.

In some embodiments that communicate OFDM signals or OFDMA signals, such as through the WBPC 108A, the TX BBP 404 may be configured to generate OFDM or OFDMA signals as appropriate for transmission by performing an inverse fast Fourier transform (IFFT). The RX BBP 402 may be configured to process received OFDM signals or OFDMA signals by performing an FFT. In some embodiments, the RX BBP 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the one or more antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Although the radio architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

In some embodiments, the radio architecture 100 is implemented in a computing device, which includes a plurality of baseband processing circuitries (e.g., baseband processing circuitry in each of the WLAN/BT adaptor 102, the WWAN adaptor 114, and the wired LAN adaptor 116). Each baseband processing circuitry of the plurality of baseband processing circuitries is configured to process signals for reception or transmission using a communication standard of a corresponding plurality of communication standards (e.g., a WLAN-based communication standard, a WWAN-based communication standard, and a wired LAN-based communication standard). The computing device further includes an application processor (e.g., the application processor 111) coupled to the plurality of baseband processing circuitries, the application processor is configured to determine the bandwidth of an application executing on the application processor of the computing device. The application processor further determines a plurality of latencies associated with each baseband processing circuitry of the plurality of baseband processing circuitries. The application processor further selects a baseband processing circuitry of the plurality of baseband processing circuitries to process transmit or receive data of the application based on the bandwidth and the plurality of latencies. In some aspects, the above-listed functions of the application processor may be performed dynamically (e.g., at a pre-configured interval) to determine the bandwidth, determine the latencies, and perform the network adaptor (and corresponding baseband processing circuitry) selection based on the bandwidth and the latencies.

There are many applications such as wireless download or wireless backup to a cloud server where terabytes of data may need to be uploaded or downloaded. On the other hand, there are many applications (e.g., virtual meeting applications) where the data demands are not as high as the data download or backup applications. For the wired LAN adaptor, the power consumption for idle and lower bandwidth is relatively high due to the need for the PHY link to be powered. Similarly, for the WWAN adaptor, due to the high demand for modulation and higher BW, the resources and power required for such an adaptor are significantly higher than the wired LAN adaptor. In general computing device use cases, applications use higher bandwidth for a limited duration (e.g., downloading or uploading a large file), with the application using a lower bandwidth for most of the remaining time. In this regard, the optimal power and performance for such use cases may include using the WLAN adaptor as the default interface and when there is a need for higher bandwidth (e.g., application bandwidth is greater than a pre-configured bandwidth threshold), the wired LAN adaptor is selected. A similar selection concept may be used for the latency-driven requirement for the application. For example, if a small latency (e.g., latency lower than a pre-configured latency threshold) is required then the WWAN adaptor may be used, and when such latency is no longer needed, network traffic may use the WLAN adaptor or the wired LAN adaptor based on the requirement (e.g., based on the bandwidth of the application).

In some embodiments, the plurality of baseband processing circuitries includes a first baseband processing circuitry (e.g., the baseband processing circuitry of the wired LAN adaptor 116) configured to process the signals for reception or transmission using a wired LAN protocol standard of the plurality of communication standards. The plurality of baseband processing circuitries includes a second baseband processing circuitry (e.g., the baseband processing circuitry of the WLAN/BT adaptor 102) configured to process the signals for reception or transmission using a WLAN protocol standard of the plurality of communication standards. The plurality of baseband processing circuitries includes a third baseband processing circuitry (e.g., the baseband processing circuitry of the WWAN adaptor 114) configured to process the signals for reception or transmission using a WWAN protocol (e.g., a 5G, 6G, etc.) standard of the plurality of communication standards.

In some embodiments, to determine the plurality of latencies, the application processor is configured to encode an Internet Control Message Protocol (ICMP) packet for transmission via the second baseband processing circuitry and the third baseband processing circuitry. The application processor is further configured to determine a WLAN latency of the plurality of latencies based on a round-trip time between the transmission and reception of the ICMP packet by the second baseband processing circuitry. The application processor further determines a WWAN latency of the plurality of latencies based on a round-trip time between the transmission and reception of the ICMP packet by the third baseband processing circuitry.

In some embodiments, the application processor 111 is configured to select the baseband processing circuitry of the wired LAN adaptor 116 to process the transmit or receive data of the application, when the bandwidth of the application is higher than a threshold bandwidth. The application processor 111 is configured to compare the latency of the baseband processing circuitry of the WLAN/BT adaptor 102 with a latency of the baseband processing circuitry of the WWAN adaptor 116 when the bandwidth of the application is equal to or lower than the threshold bandwidth.

In some embodiments, the application processor 111 is configured to select the baseband processing circuitry of the WLAN/BT adaptor 102 to process the transmit or receive data of the application when the latency of the baseband processing circuitry of the WLAN/BT adaptor 102 is lower than the latency of the baseband processing circuitry of the WWAN adaptor 114. The application processor 111 is configured to select the baseband processing circuitry of the WWAN adaptor 114 to process the transmit or receive data of the application when the latency of the baseband processing circuitry of the WLAN/BT adaptor 102 is higher than the latency of the baseband processing circuitry of the WWAN adaptor 114.

Figure 5:
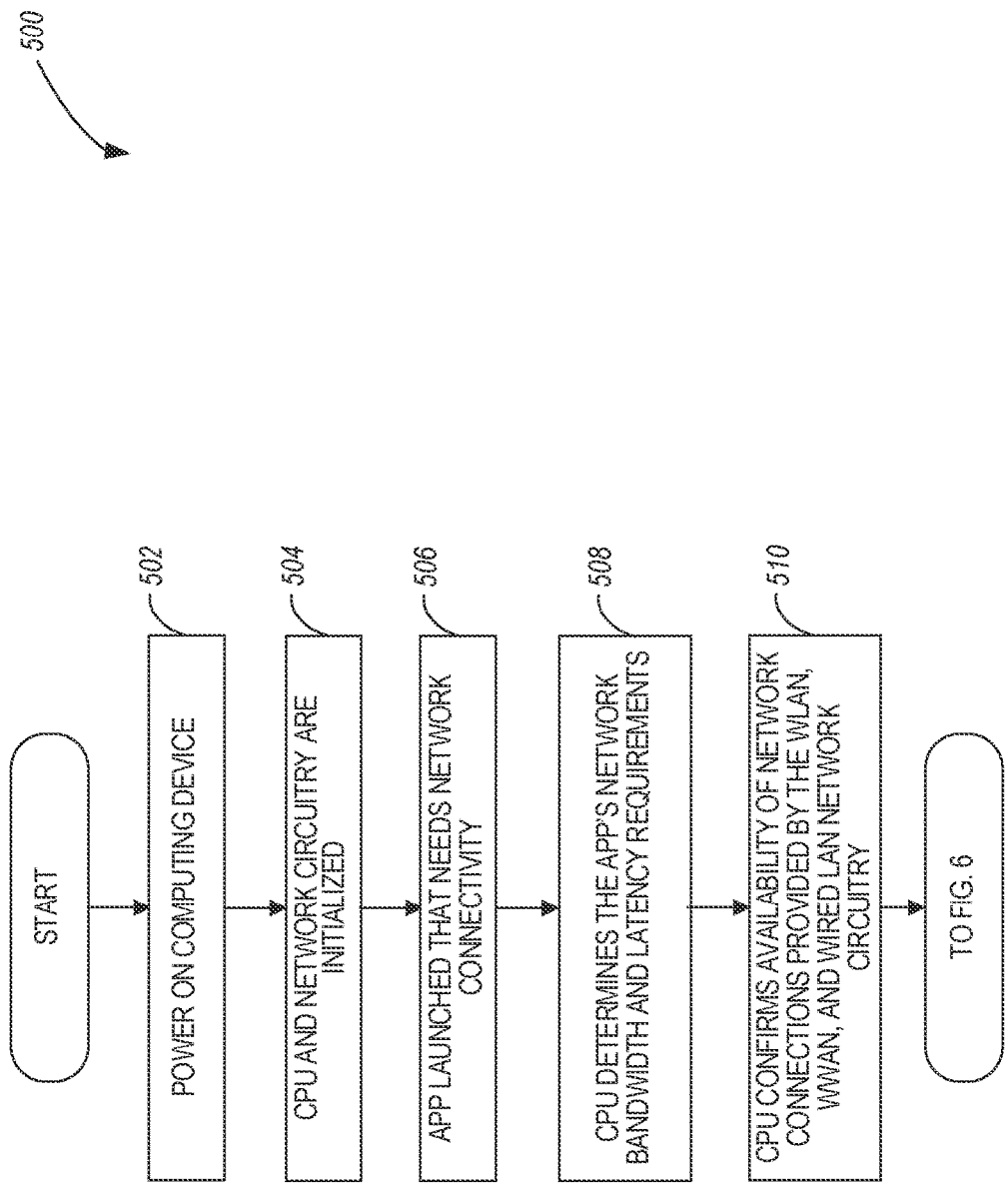
FIG. 5 and FIG. 6 illustrate a flow diagram of a method for dynamic selection of a network processing circuitry from multiple network processing circuitries in a computing device, in accordance with some embodiments.
Figure 6:
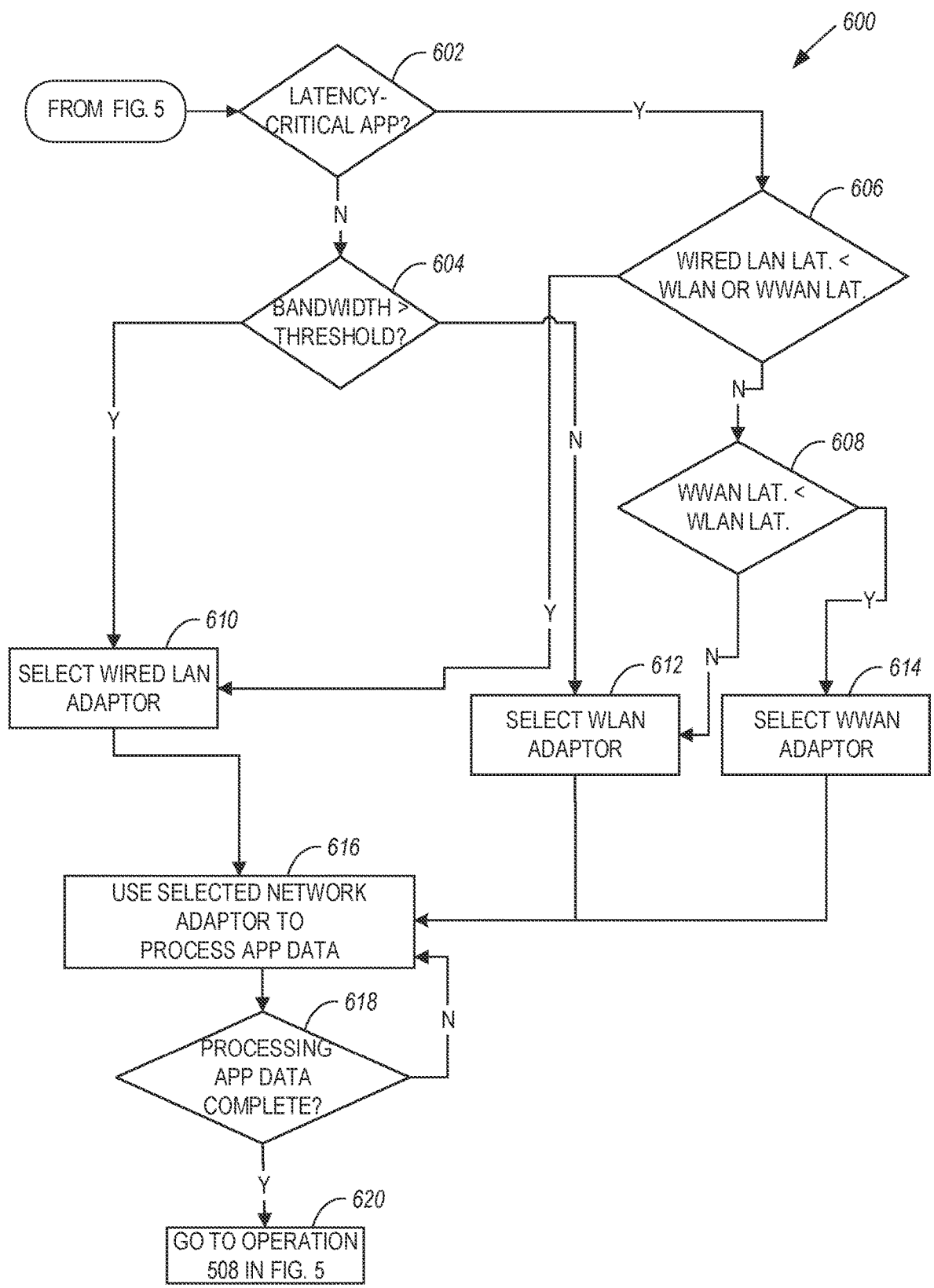

FIG. 5 and FIG. 6 illustrate flow diagrams of a method (including sub-methods 500 and 600) for dynamic selection of a network processing circuitry (e.g., a network adaptor such as a network card) from multiple network processing circuitries (e.g., multiple network adaptors such as network cards) in a computing device, in accordance with some embodiments. More specifically, FIG. 5 illustrates a sub-method 500 including functions 502, 504, 506, 508, and 510 which may be performed within a computing device including the radio architecture 100 of FIG. 1.

At operation 502, the computing device is powered ON. At operation 504, the application processor 111 and the network adaptors (e.g., network adaptors 102, 114, and 116) are initialized. At operation 506, an application is launched/executed by the application processor 111, where the application may need network connectivity. At operation 508, the application processor 111 determines the network bandwidth (e.g., a bandwidth requirement) of the application. Additionally, the application processor determines a plurality of latencies associated with each of the network adaptors. The latency determination may be based on using a ping packet (e.g., an Internet Control Message Protocol, or ICMP packet) to determine a round-trip time for each of the adaptors (with the round-trip time being indicative of the corresponding latency). At operation 510, the application processor 111 confirms the availability of network connections provided by the network adaptors (e.g., WLAN connection, WLAN connection, and wired LAN connection).

Processing then continues to sub-method 600 of FIG. 6, which includes operations 602, 604, 606, 608, 610, 612, 614, 616, 618, and 620.

At operation 602, a determination is made on whether the application is latency-critical (e.g., having lower latency is essential for executing the application or performing functions of the application). If the application is not latency-critical, processing continues at operation 604, when a determination is made on whether the bandwidth of the application is greater than a threshold bandwidth (e.g., 1 Gbps or another bandwidth that may be pre-configured).

At operation 610, if the bandwidth is greater than the threshold bandwidth, the wired LAN adaptor 116 is selected and processing continues at operation 616. At operation 612, if the bandwidth is smaller than or equal to the threshold bandwidth, the WLAN/BT adaptor 102 is selected and processing continues at operation 616.

If the application is not a latency-critical application, at operation 606, a determination is made on whether the wired LAN adaptor latency is smaller than the WLAN adaptor latency and the wired LAN adaptor latency is smaller than the WWAN adaptor latency. If the wired LAN adaptor latency is smaller than the latencies of both the WLAN and WWAN adaptors, processing continues at operation 610 when the wired LAN adaptor is selected. If the wired LAN adaptor latency is higher than the latencies of either the WLAN adaptor or the WWAN adaptor, processing continues at operation 608 when a determination is made on whether the latency of the WWAN adaptor 114 is smaller than the latency of the WLAN adaptor.

If the latency of the WWAN adaptor 114 is smaller than the latency of the WLAN adaptor, at operation 614, the WWAN adaptor 114 is selected. If the latency of the WWAN adaptor 114 is greater than or equal to the latency of the WLAN adaptor, at operation 612, the WLAN/BT adaptor 102 is selected.

At operation 616, the selected network adaptor is used to process (e.g., transmit or receive) the application data. At operation 618 a determination is made on whether processing of the application data is complete. If the processing of the data is not complete, processing continues with operation 616. If the processing of the data is complete, processing continues at operation 620, which initiates operation 508 of FIG. 5. In some embodiments, the determination of the bandwidth, latencies, and the selection of the adaptor may be performed dynamically (e.g., at pre-configured intervals), when the application processor detects a change in network conditions (e.g., change in throughput) or when a new application is executed.

Figure 7:
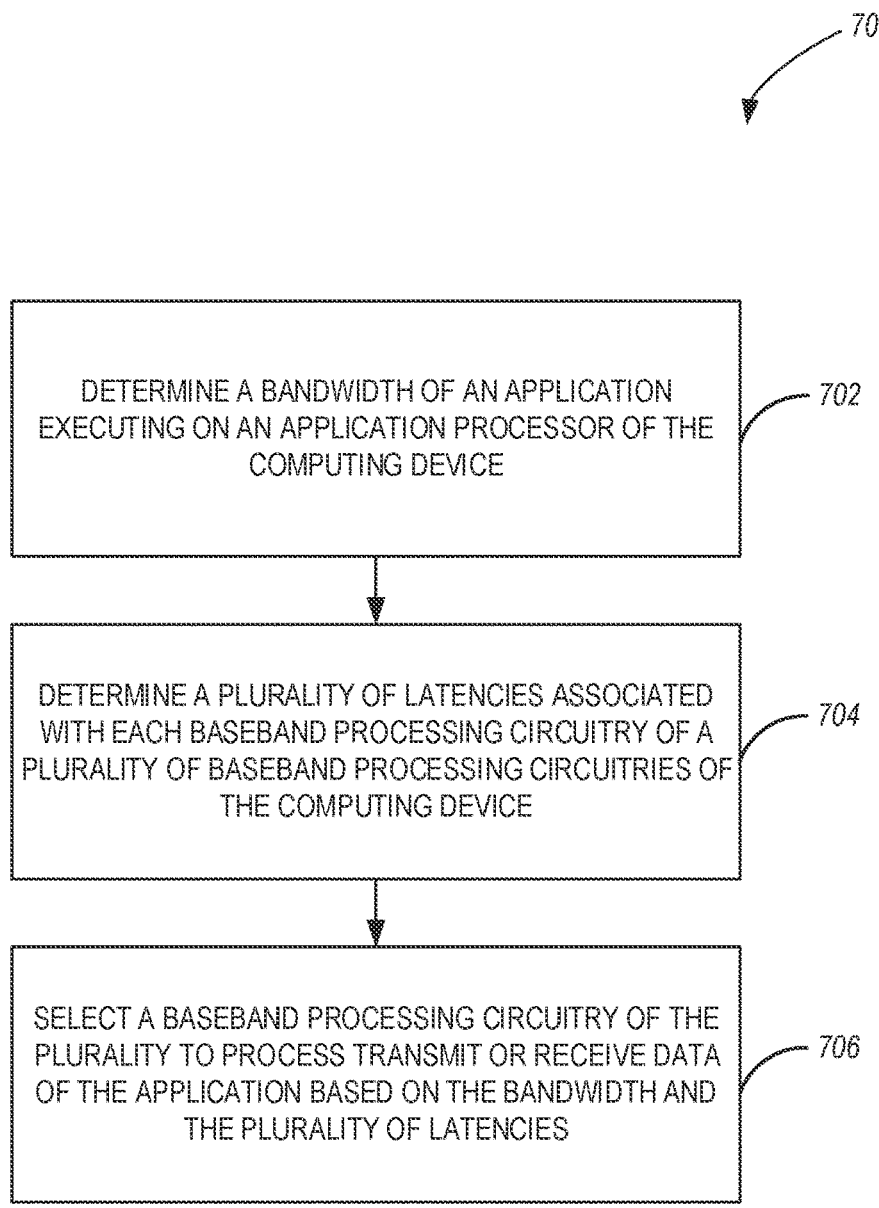
FIG. 7 illustrates a flow diagram of another method for dynamic selection of a network processing circuitry from multiple network processing circuitries in a computing device, in accordance with some embodiments.

FIG. 7 illustrates a flow diagram of another method 700 for dynamic selection of a network processing circuitry (e.g., a network adaptor such as a network card) from multiple network processing circuitries in a computing device, in accordance with some embodiments. Referring to FIG. 7, method 700 includes operations 702, 704, and 706, which may be executed by the application processor 111.

At operation 702, a bandwidth of an application executing on the application processor 111 of a computing device is determined. At operation 704, a plurality of latencies associated with each baseband processing circuitry of a plurality of baseband processing circuitries of the computing device is determined. Each baseband processing circuitry of the plurality is configured to process signals for reception or transmission using a communication standard of a corresponding plurality of communication standards. At operation 706, a baseband processing circuitry of the plurality is selected (e.g., by selecting a corresponding network adaptor that includes the baseband processing circuitry) to process transmit or receive data of the application based on the bandwidth and the plurality of latencies.

In some embodiments, the plurality of baseband processing circuitries includes a baseband processing circuitry configured to process the signals for reception or transmission using a wired LAN protocol standard of the plurality of communication standards (e.g., baseband processing circuitry of the wired LAN adaptor 116). The plurality of baseband processing circuitries includes a baseband processing circuitry configured to process the signals for reception or transmission using a WLAN protocol standard of the plurality of communication standards (e.g., the baseband processing circuitry of the WLAN/BT adaptor 102). The plurality of baseband processing circuitries includes a baseband processing circuitry configured to process the signals for reception or transmission using a WWAN protocol standard of the plurality of communication standards. (e.g., the baseband processing circuitry of the WWAN adaptor 114).

In some embodiments, determining the plurality of latencies includes encoding an Internet Control Message Protocol (ICMP) packet for transmission via the baseband processing circuitry of the WLAN/BT adaptor 102 and the baseband processing circuitry of the WWAN adaptor 114. The application processor 111 further determines a WLAN latency of the plurality of latencies based on a round-trip time between the transmission and reception of the ICMP packet by the baseband processing circuitry of the WLAN/BT adaptor 102. The application processor 111 further determines a WWAN latency of the plurality of latencies based on a round-trip time between the transmission and reception of the ICMP packet by the baseband processing circuitry of the WWAN adaptor 114.

In some embodiments, the application processor 111 further selects the baseband processing circuitry of the WLAN/BT adaptor 102 to process the transmit or receive data of the application when the WLAN latency is lower than the WWAN latency. The application processor 111 further selects the baseband processing circuitry of the WWAN adaptor 114 to process the transmit or receive data of the application, when the WLAN latency is higher than the WWAN latency.

Figure 8:
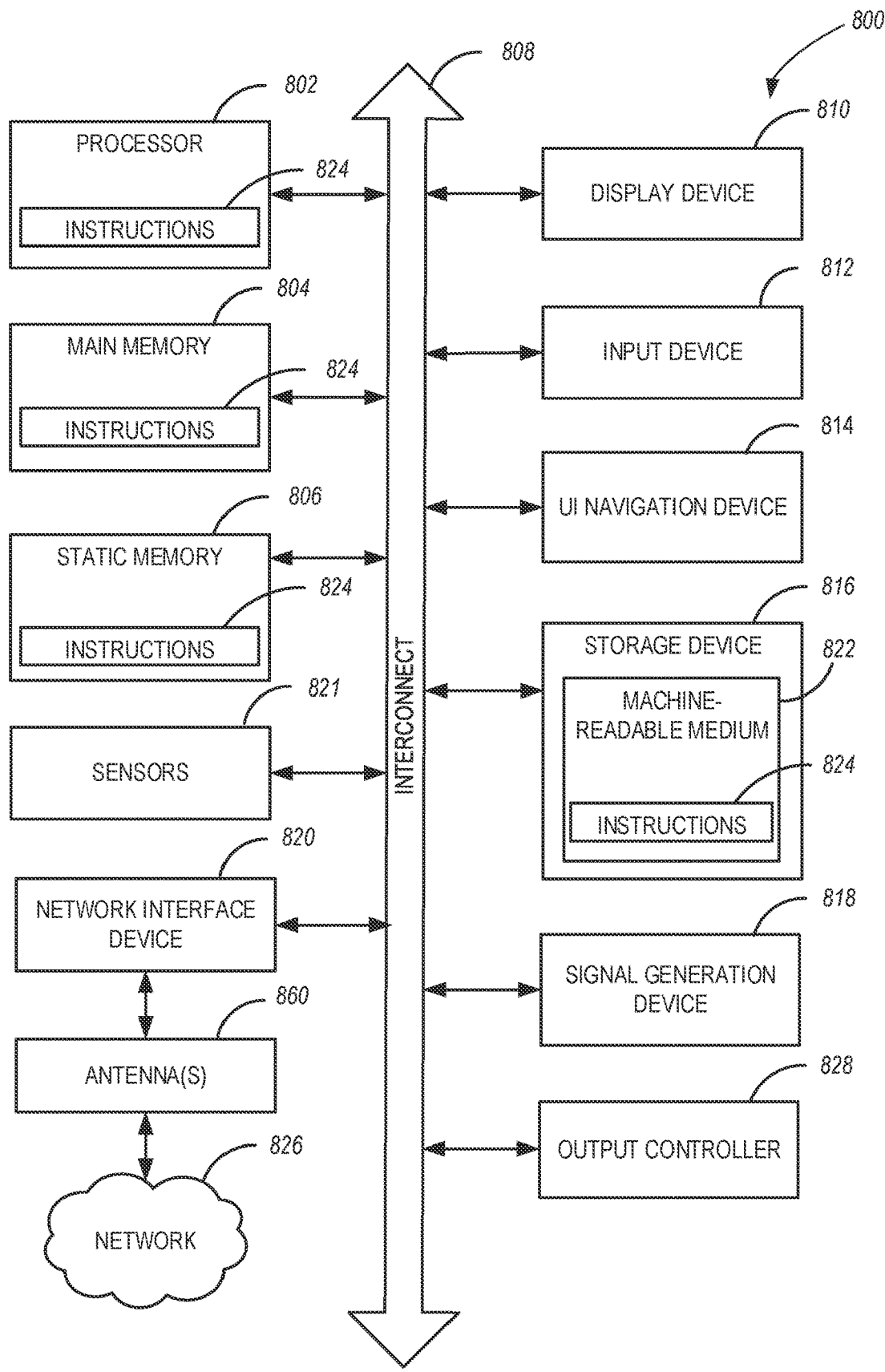
FIG. 8 illustrates a block diagram of an example machine upon which any one or more of the operations/techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, machine 800 may operate in the capacity of a server machine, a client machine, or both in server-client network environments. In an example, the machine 800 may act as a peer machine in a peer-to-peer (P2P) (or other distributed) network environment. The machine 800 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 800 may include a hardware processor 802 (e.g., a central processing unit (CPU), a graphics processing unit (GPU), a hardware processor core, or any combination thereof), a main memory 804, and a static memory 806, some or all of which may communicate with each other via an interlink (e.g., bus) 808.

Specific examples of main memory 804 include Random Access Memory (RAM), and semiconductor memory devices, which may include, in some embodiments, storage locations in semiconductors such as registers. Specific examples of static memory 806 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 800 may further include a display device 810, an input device 812 (e.g., a keyboard), and a user interface (UI) navigation device 814 (e.g., a mouse). In an example, the display device 810, input device 812, and UI navigation device 814 may be a touch screen display. The machine 800 may additionally include a storage device (e.g., drive unit or another mass storage device) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 802 and/or instructions 824 may comprise processing circuitry and/or transceiver circuitry.

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 822 is illustrated as a single medium, the term "machine-readable medium" may include a single medium or multiple media (e.g., a centralized or distributed database, and/or associated caches and servers) configured to store one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, one or more sensors 821, a network interface device 820, antennas 860, a display device 810, an input device 812, a UI navigation device 814, a storage device 816, instructions 824, a signal generation device 818, and an output controller 828. The apparatus may be configured to perform one or more of the methods and/or operations disclosed herein. The apparatus may be intended as a component of the machine 800 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding, or carrying instructions for execution by the machine 800, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM);

random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereot) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to ¹/₁₀ of a wavelength or more.

ADDITIONAL NOTES AND EXAMPLES

Example 1 is a computing device comprising: a plurality of baseband processing circuitries, each baseband processing circuitry of the plurality of baseband processing circuitries configured to process signals for reception or transmission using a communication standard of a corresponding plurality of communication standards; and an application processor coupled to the plurality of baseband processing circuitries, the application processor configured to determine the bandwidth of an application executing on the application processor of the computing device; determine a plurality of latencies associated with each baseband processing circuitry of the plurality of baseband processing circuitries; and select a baseband processing circuitry of the plurality of baseband processing circuitries to process transmit or receive data of the application based on the bandwidth and the plurality of latencies.

In Example 2, the subject matter of Example 1 includes, wherein the plurality of baseband processing circuitries comprises a first baseband processing circuitry configured to process the signals for reception or transmission using a wired Local Area Network (LAN) protocol standard of the plurality of communication standards.

In Example 3, the subject matter of Example 2 includes, wherein the plurality of baseband processing circuitries comprises a second baseband processing circuitry configured to process the signals for reception or transmission using a wireless LAN (WLAN) protocol standard of the plurality of communication standards.

In Example 4, the subject matter of Example 3 includes, wherein the plurality of baseband processing circuitries comprises a third baseband processing circuitry configured to process the signals for reception or transmission using a wireless Wide Area Network (WWAN) protocol standard of the plurality of communication standards.

In Example 5, the subject matter of Example 4 includes, wherein to determine the plurality of latencies, the application processor is configured to encode an Internet Control Message Protocol (ICMP) packet for transmission via the second baseband processing circuitry and the third baseband processing circuitry.

In Example 6, the subject matter of Example 5 includes, wherein to determine the plurality of latencies, the application processor is configured to determine a WLAN latency of the plurality of latencies based on a round-trip time between the transmission and reception of the ICMP packet by the second baseband processing circuitry; and determine a WWAN latency of the plurality of latencies based on a round-trip time between the transmission and reception of the ICMP packet by the third baseband processing circuitry.

In Example 7, the subject matter of Examples 4-6 includes, wherein the application processor is configured to select the first baseband processing circuitry to process the transmit or receive data of the application when the bandwidth of the application is higher than a threshold bandwidth.

In Example 8, the subject matter of Example 7 includes, wherein the application processor is configured to compare a latency of the second baseband processing circuitry with a latency of the third baseband processing circuitry when the bandwidth of the application is equal to or lower than the threshold bandwidth.

In Example 9, the subject matter of Example 8 includes, wherein the application processor is configured to select the second baseband processing circuitry to process the transmit or receive data of the application when the latency of the second baseband processing circuitry is lower than the latency of the third baseband processing circuitry; and select the third baseband processing circuitry to process the transmit or receive data of the application, when the latency of the second baseband processing circuitry is higher than the latency of the third baseband processing circuitry.

Example 10 is a computing device comprising: a first baseband processing circuitry configured to process signals for reception or transmission using a wired Local Area Network (LAN) protocol standard; a second baseband processing circuitry configured to process the signals for reception or transmission using a wireless LAN (WLAN) protocol standard; a third baseband processing circuitry configured to process the signals for reception or transmission using a wireless Wide Area Network (WWAN) protocol standard; an application processor coupled to the first, second, and third baseband processing circuitries, the application processor configured to: determine a bandwidth of an application executing on the application processor of the computing device; determine a plurality of latencies associated with each of the first, second, and third baseband processing circuitries; and select one of the first, second, and third baseband processing circuitries to process transmit or receive data of the application based on the bandwidth and the plurality of latencies.

In Example 11, the subject matter of Example 10 includes, wherein to determine the plurality of latencies, the application processor is configured to encode an Internet Control Message Protocol (ICMP) packet for transmission via the second baseband processing circuitry and the third baseband processing circuitry.

In Example 12, the subject matter of Example 11 includes, wherein to determine the plurality of latencies, the application processor is configured to determine a WLAN latency of the plurality of latencies based on a round-trip time between the transmission and reception of the ICMP packet by the second baseband processing circuitry; and determine a WWAN latency of the plurality of latencies based on a round-trip time between the transmission and reception of the ICMP packet by the third baseband processing circuitry.

In Example 13, the subject matter of Example 12 includes, wherein the application processor is configured to select the first baseband processing circuitry to process the transmit or receive data of the application when the bandwidth of the application is higher than a threshold bandwidth.

In Example 14, the subject matter of Example 13 includes, wherein the application processor is configured to compare the WLAN latency with the WWAN latency when the bandwidth of the application is equal to or lower than the threshold bandwidth.

In Example 15, the subject matter of Example 14 includes, wherein the application processor is configured to select the second baseband processing circuitry to process the transmit or receive data of the application when the WLAN latency is lower than the WWAN latency; and select the third baseband processing circuitry to process the transmit or receive data of the application, when the WLAN latency is higher than the WWAN latency.

Example 16 is a method for selecting network processing circuitry in a computing device, the method comprising: determining a bandwidth of an application executing on an application processor of the computing device; determining a plurality of latencies associated with each baseband processing circuitry of a plurality of baseband processing circuitries of the computing device, each baseband processing circuitry of the plurality configured to process signals for reception or transmission using a communication standard of a corresponding plurality of communication standards; and selecting a baseband processing circuitry of the plurality to process transmit or receive data of the application based on the bandwidth and the plurality of latencies.

In Example 17, the subject matter of Example 16 includes, wherein the plurality of baseband processing circuitries comprises: a first baseband processing circuitry configured to process the signals for reception or transmission using a wired Local Area Network (LAN) protocol standard of the plurality of communication standards; a second baseband processing circuitry configured to process the signals for reception or transmission using a wireless LAN (WLAN) protocol standard of the plurality of communication standards; a third baseband processing circuitry configured to process the signals for reception or transmission using a wireless Wide Area Network (WWAN) protocol standard of the plurality of communication standards.

In Example 18, the subject matter of Example 17 includes, wherein determining the plurality of latencies comprises: encoding an Internet Control Message Protocol (ICMP) packet for transmission via the second baseband processing circuitry and the third baseband processing circuitry.

In Example 19, the subject matter of Example 18 includes, determining a WLAN latency of the plurality of latencies based on a round-trip time between the transmission and reception of the ICMP packet by the second baseband processing circuitry; and determine a WWAN latency of the plurality of latencies based on a round-trip time between the transmission and reception of the ICMP packet by the third baseband processing circuitry.

In Example 20, the subject matter of Example 19 includes, selecting the second baseband processing circuitry to process the transmit or receive data of the application when the WLAN latency is lower than the WWAN latency; and selecting the third baseband processing circuitry to process the transmit or receive data of the application, when the WLAN latency is higher than the WWAN latency.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. A computing device comprising:
a plurality of baseband processing circuitries, each baseband processing circuitry of the plurality of baseband processing circuitries configured to process signals for reception or transmission using a communication standard of a corresponding plurality of communication standards; and
an application processor coupled to the plurality of baseband processing circuitries, the application processor configured to:
determine a bandwidth of an application executing on the application processor of the computing device;
determine a plurality of latencies associated with each baseband processing circuitry of the plurality of baseband processing circuitries; and
select a baseband processing circuitry of the plurality of baseband processing circuitries to process transmit or receive data of the application based on the bandwidth and the plurality of latencies.

2. The computing device of claim 1, wherein the plurality of baseband processing circuitries comprises a first baseband processing circuitry configured to process the signals for reception or transmission using a wired Local Area Network (LAN) protocol standard of the plurality of communication standards.

3. The computing device of claim 2, wherein the plurality of baseband processing circuitries comprises a second baseband processing circuitry configured to process the signals for reception or transmission using a wireless LAN (WLAN) protocol standard of the plurality of communication standards.

4. The computing device of claim 3, wherein the plurality of baseband processing circuitries comprises a third baseband processing circuitry configured to process the signals for reception or transmission using a wireless Wide Area Network (WWAN) protocol standard of the plurality of communication standards.

5. The computing device of claim 4, wherein to determine the plurality of latencies, the application processor is configured to:
encode an Internet Control Message Protocol (ICMP) packet for transmission via the second baseband processing circuitry and the third baseband processing circuitry.

6. The computing device of claim 5, wherein to determine the plurality of latencies, the application processor is configured to:
determine a WLAN latency of the plurality of latencies based on a round-trip time between the transmission and reception of the ICMP packet by the second baseband processing circuitry; and
determine a WWAN latency of the plurality of latencies based on a round-trip time between the transmission and reception of the ICMP packet by the third baseband processing circuitry.

7. The computing device of claim 4, wherein the application processor is configured to:
select the first baseband processing circuitry to process the transmit or receive data of the application, when the bandwidth of the application is higher than a threshold bandwidth.

8. The computing device of claim 7, wherein the application processor is configured to:
compare a latency of the second baseband processing circuitry with a latency of the third baseband processing circuitry, when the bandwidth of the application is equal to or lower than the threshold bandwidth.

9. The computing device of claim 8, wherein the application processor is configured to:
select the second baseband processing circuitry to process the transmit or receive data of the application, when the latency of the second baseband processing circuitry is lower than the latency of the third baseband processing circuitry; and
select the third baseband processing circuitry to process the transmit or receive data of the application, when the latency of the second baseband processing circuitry is higher than the latency of the third baseband processing circuitry.

10. A computing device comprising:
a first baseband processing circuitry configured to process signals for reception or transmission using a wired Local Area Network (LAN) protocol standard;
a second baseband processing circuitry configured to process the signals for reception or transmission using a wireless LAN (WLAN) protocol standard;
a third baseband processing circuitry configured to process the signals for reception or transmission using a wireless Wide Area Network (WWAN) protocol standard; and
an application processor coupled to the first, second, and third baseband processing circuitries, the application processor configured to:
determine a bandwidth of an application executing on the application processor of the computing device;
determine a plurality of latencies associated with each of the first, second, and third baseband processing circuitries; and
select one of the first, second, and third baseband processing circuitries to process transmit or receive data of the application based on the bandwidth and the plurality of latencies.

11. The computing device of claim 10, wherein to determine the plurality of latencies, the application processor is configured to:
encode an Internet Control Message Protocol (ICMP) packet for transmission via the second baseband processing circuitry and the third baseband processing circuitry.

12. The computing device of claim 11, wherein to determine the plurality of latencies, the application processor is configured to:
determine a WLAN latency of the plurality of latencies based on a round-trip time between the transmission and reception of the ICMP packet by the second baseband processing circuitry; and
determine a WWAN latency of the plurality of latencies based on a round-trip time between the transmission and reception of the ICMP packet by the third baseband processing circuitry.

13. The computing device of claim 12, wherein the application processor is configured to:

select the first baseband processing circuitry to process the transmit or receive data of the application, when the bandwidth of the application is higher than a threshold bandwidth.

14. The computing device of claim 13, wherein the application processor is configured to:
compare the WLAN latency with the WWAN latency, when the bandwidth of the application is equal to or lower than the threshold bandwidth.

15. The computing device of claim 14, wherein the application processor is configured to:
select the second baseband processing circuitry to process the transmit or receive data of the application, when the WLAN latency is lower than the WWAN latency; and
select the third baseband processing circuitry to process the transmit or receive data of the application, when the WLAN latency is higher than the WWAN latency.

16. A method for selecting network processing circuitry in a computing device, the method comprising:
determining a bandwidth of an application executing on an application processor of the computing device;
determining a plurality of latencies associated with each baseband processing circuitry of a plurality of baseband processing circuitries of the computing device, each baseband processing circuitry of the plurality configured to process signals for reception or transmission using a communication standard of a corresponding plurality of communication standards; and
selecting a baseband processing circuitry of the plurality to process transmit or receive data of the application based on the bandwidth and the plurality of latencies.

17. The method of claim 16, wherein the plurality of baseband processing circuitries comprises:
a first baseband processing circuitry configured to process the signals for reception or transmission using a wired Local Area Network (LAN) protocol standard of the plurality of communication standards;
a second baseband processing circuitry configured to process the signals for reception or transmission using a wireless LAN (WLAN) protocol standard of the plurality of communication standards; and
a third baseband processing circuitry configured to process the signals for reception or transmission using a wireless Wide Area Network (WWAN) protocol standard of the plurality of communication standards.

18. The method of claim 17, wherein determining the plurality of latencies comprises:
encoding an Internet Control Message Protocol (ICMP) packet for transmission via the second baseband processing circuitry and the third baseband processing circuitry.

19. The method of claim 18, further comprising:
determining a WLAN latency of the plurality of latencies based on a round-trip time between the transmission and reception of the ICMP packet by the second baseband processing circuitry; and
determine a WWAN latency of the plurality of latencies based on a round-trip time between the transmission and reception of the ICMP packet by the third baseband processing circuitry.

20. The method of claim 19, further comprising:
selecting the second baseband processing circuitry to process the transmit or receive data of the application, when the WLAN latency is lower than the WWAN latency; and
selecting the third baseband processing circuitry to process the transmit or receive data of the application, when the WLAN latency is higher than the WWAN latency.

* * * * *